US012540477B2

(12) United States Patent
McArthur

(10) Patent No.: US 12,540,477 B2
(45) Date of Patent: Feb. 3, 2026

(54) CONSTRUCTION PACKER

(71) Applicant: Jacob Wajsman McArthur, Dandenong South (AU)

(72) Inventor: Jacob Wajsman McArthur, Dandenong South (AU)

( * ) Notice: Subject to any disclaimer, the term of this patent is extended or adjusted under 35 U.S.C. 154(b) by 371 days.

(21) Appl. No.: 18/246,722

(22) PCT Filed: Sep. 28, 2021

(86) PCT No.: PCT/AU2021/051125
§ 371 (c)(1),
(2) Date: Mar. 27, 2023

(87) PCT Pub. No.: WO2022/067379
PCT Pub. Date: Apr. 7, 2022

(65) Prior Publication Data

US 2024/0011309 A1 Jan. 11, 2024

(30) Foreign Application Priority Data

Sep. 30, 2020 (AU) ................................ 2020903534

(51) Int. Cl.
*E04G 21/18* (2006.01)
*E06B 1/60* (2006.01)

(52) U.S. Cl.
CPC ........ *E04G 21/1883* (2013.01); *E06B 1/6069* (2013.01)

(58) Field of Classification Search
CPC .......................... E04G 21/1883; E06B 1/6069
USPC .................................. 33/518, 562, 613, 645
See application file for complete search history.

(56) References Cited

U.S. PATENT DOCUMENTS

| | | | | |
|---|---|---|---|---|
| 4,232,068 | A | 11/1980 | Hoh et al. | |
| 6,560,934 | B1 | 5/2003 | Norkman | |
| 6,988,323 | B2 * | 1/2006 | McAdam | B21D 5/042 33/534 |
| 8,528,282 | B1 * | 9/2013 | Hemphill | E04B 2/825 52/170 |
| 9,345,325 | B2 * | 5/2016 | Floersch | F16M 13/00 |
| 9,855,719 | B2 * | 1/2018 | Gastel | B32B 3/14 |
| 10,518,483 | B2 * | 12/2019 | Nesbit | G06F 30/00 |
| 10,934,725 | B2 * | 3/2021 | Suwyn | E04F 21/20 |

(Continued)

FOREIGN PATENT DOCUMENTS

| | | |
|---|---|---|
| CH | 700880 A2 | 10/2010 |
| EP | 2163697 A2 | 3/2010 |

(Continued)

OTHER PUBLICATIONS

Leopold Filipovic; International Search Report and Written Opinion; International application No. PCT/AU2021/051125; Nov. 15, 2021; Australian Patent Office; Woden ACT Australia.

*Primary Examiner* — George B Bennett
(74) *Attorney, Agent, or Firm* — Stevens & Showalter LLP

(57) ABSTRACT

A construction packer comprising a base part including a base shim and a wall component extending substantially perpendicular to the base shim, the wall component having a first interlocking feature; and a stacking shim configured to be placed on top of the base shim and having a second interlocking feature provided at an edge thereof that engages with the first interlocking feature to provide an assembled construction packer.

13 Claims, 6 Drawing Sheets

(56) References Cited

U.S. PATENT DOCUMENTS

| | | | | |
|---|---|---|---|---|
| 2005/0223919 | A1* | 10/2005 | Oleson | B41F 15/36<br>101/127.1 |
| 2007/0166498 | A1* | 7/2007 | Penar | E06B 1/6069<br>428/40.1 |
| 2016/0018206 | A1* | 1/2016 | Hollis | G01C 9/28<br>33/354 |
| 2020/0256069 | A1* | 8/2020 | Suwyn | E04F 21/20 |

FOREIGN PATENT DOCUMENTS

| | | | |
|---|---|---|---|
| GB | 2078328 | A | 1/1982 |
| WO | 2020087103 | A1 | 5/2020 |

* cited by examiner

FIGURE 7A
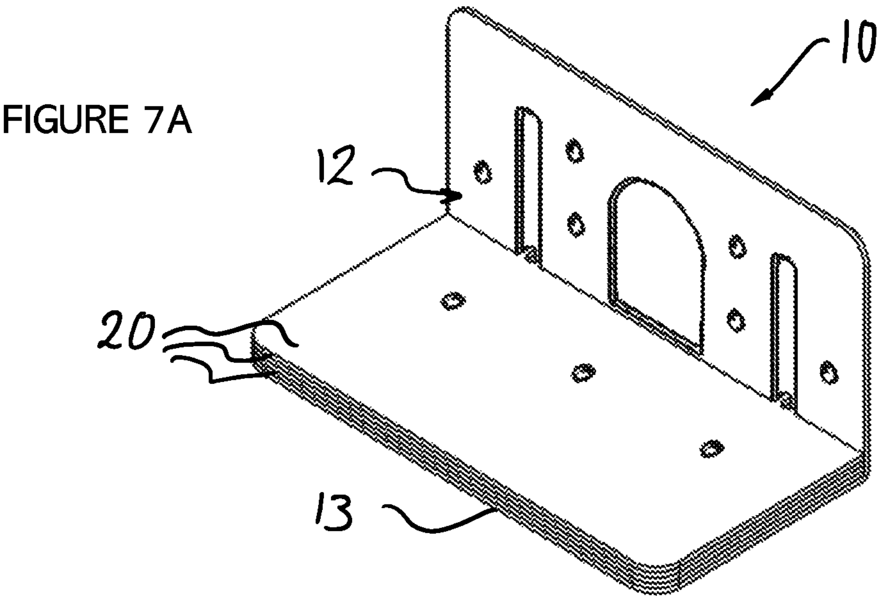
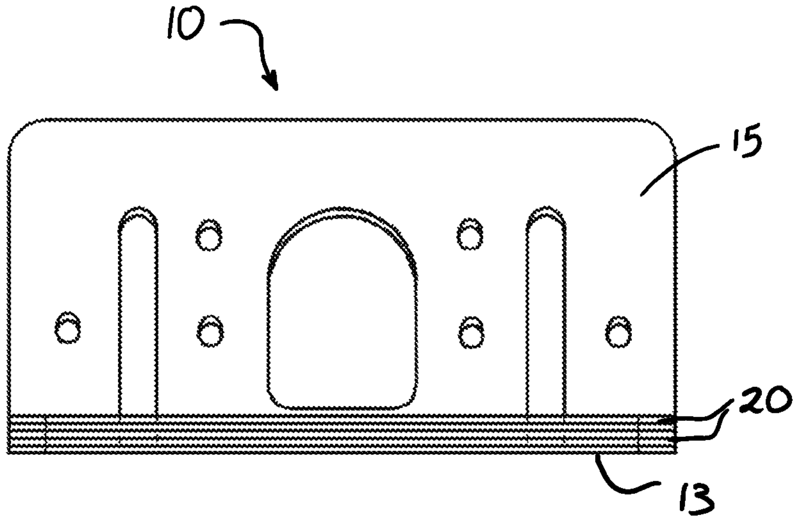
FIGURE 7B
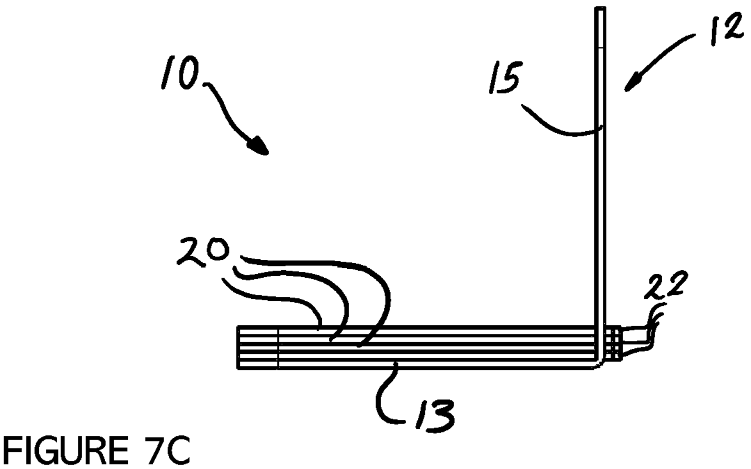
FIGURE 7C

CONSTRUCTION PACKER

FIELD OF INVENTION

The present invention relates to a construction packer, also referred to as a building packer or a packing shim, for use in construction for levelling structures and packing gaps.

BACKGROUND

In building and construction, tradespeople, such as carpenters and glaziers, need to deal with irregular surfaces and substrates in order to produce an accurately levelled finished product. Irregularities in surfaces that require levelling commonly occur when attaching new structures to old structures, such as with door frames, lintels and window frames. New structures will also need leveling due to acceptable tolerances in framing walls, floors and trusses, or building on slightly uneven foundations.

Packers, also referred to as shims, are planar cuts of timber or sections of metal or plastic used to fit in and fill gaps to pack and level a structure. Tradespeople have used timber or metal shims for decades using offcuts on site. More recently, plastic packers have been produced specifically for the task of packing and to avoid the pitfalls with timber and metal in that they can corrode, rot, swell with moisture or, in the case of timber, be susceptible to pests including termites.

Building packers, particularly those made of plastics, are formed for quick and convenient use. Packers of different thicknesses are colour-coded for easy visual size selection. Some are horseshoe shaped, or U-shaped, with a central slot for placement around locating bolts, pins, starter bars, or the like. Others are solid shims for levelling walls or concrete panels. Packers are often also required to withstand high loads and therefore have a high compressive strength. Most are provided with fastening holes, or have provision for drilling fastening holes, if the tradesperson desires to screw or nail the packer onto the structure.

To obtain the correct wedge thickness for the desired amount of packing, multiple packers can be stacked one on top of the other before being wedged into a gap or fixed onto a surface against which a panel or beam is mounted. A problem with stacking multiple packers is that they do not always remain aligned or can slip askew as they are inserted into position. If the packers are of the same brand, fastening holes can be aligned so that the stacked packers can be fastened in position. However, where it is not needed, tradespeople will avoid the extra step of fastening a packer, and in other cases it may not be convenient to do so if the packer is required to fill a gap already there.

The present invention aims to provide a building packer that is convenient and fast to use, and that will improve the working efficiency of users in building and construction.

SUMMARY OF THE INVENTION

In a first aspect the invention provides a construction packer comprising a base part including a base shim and a base wall extending substantially perpendicular to the base shim, the wall component having a first interlocking feature; and a stacking shim configured to sit or be placed on top of the base shim and having a second interlocking feature provided at an edge thereof that engages with the first interlocking feature to provide an assembled construction packer. In other words, the construction packer can be described as unitary.

The construction packer addresses the problem of planar packers sliding askew when stacked one above the other. Fastening holes may be provided on the base part and the stacking shim, which will align, but the packer does not rely on screws through the fastening holes, as in known systems, to keep the components together. Rather, the interlocking features between the base part and the stacking shim interlock, or engage, the two components so that they can be handled and used as a single unitary piece having the correct desired packing thickness.

In a preferred embodiment of the invention the base part is adapted to receive two or more stacking shims stacked one on top of the other. Accordingly, a user is given the opportunity to select the number and thickness of stacking shims to thereby select an overall stacking height suitable to the packing required for the building task at hand. It follows that the first interlocking feature on the base part may be capable of receiving multiple second interlocking features on multiple stacking shims.

In one embodiment the first interlocking feature is a slot in the base wall, wherein the slot extends perpendicularly to a plane of the base shim. The slot is open from a juncture between the base shim and the base wall and extends up the base wall. The slot may terminate short of a top of the wall, but could continue through to the top of the base wall so that it is open from the base shim all the way through to the top of the wall. The length, or height, of the slot defines a stacking guide for the stacking shims, where the second interlocking feature inserts into the slot. When multiple stacking shims are stacked one atop of the other the length of the slot can accommodate multiple second interlocking features. In one embodiment the wall of the base part is provided with two parallel slots.

In an embodiment, the second interlocking feature is a detent that engages with the first interlocking feature, preferably permanently. The second interlocking feature is an anchoring clip protruding from a side edge of the stacking shim. The anchoring clip, also referred to as clip anchors, preferably protrudes from the side edge in the same plane as the stacking shim. The detent anchoring clip acts as a plug that is configured to have a width that narrows to squeeze through the slot but once through resiliently widens.

In one specific example, the clip or detent comprises two spaced apart short fingers each capped with an outward facing retaining lip. The fingers are resilient so that they can move toward each other to sufficiently clear and force through the slot. Resilience may be provided as a result of the material properties of the stacking shim, or as a result of the shape of the fingers, or both. Once through the slot, the lips act as anchors or catches to prevent the clips from pulling back out of the slots.

To assist, the underside of the lips may be provided with a flat anchoring surface. The upper side of the lips may be rounded or ramped to encourage insertion of the clip through the slot and assist in forcing the fingers toward each other thereby narrowing the spacing between them to clear entrance through the slot.

The stacking shims may be provided with more than one second interlocking feature, or clips, and generally the number of clips on the stacking shims will equal the number of slots provided in the base wall. Preferably, the construction packer will have two of each clips and slots.

In one embodiment the base shim may be provided with a locating recess or edge slot for accommodating or placement around building hardware such as locating bolts, pins, starter bars or other building protrusions in the vicinity of where the construction packer is required. In another embodiment the base shim is substantially solid without recesses to accommodate protrusions (aside from fastening holes), which may be suitable for packing plaster walls, and the like, where protrusions are not expected.

The base part and the stacking shim may be made from a suitable material used for packing and spacing in the building industry. This could include timber material but given the possibility of rotting and absorption of moisture, a metallic or plastics material would be more suitable. Both such materials would offer suitable resilience for resiliently interlocking the clip into the slot. In a preferred embodiment the components are made from a thermoplastic, such as polypropylene.

BRIEF DESCRIPTION OF THE FIGURES

In order that the invention be more clearly understood and put into practical effect, reference will now be made to preferred embodiments of an assembly in accordance with the present invention. The ensuing description is given by way of non-limitative example only and is with reference to the accompanying drawings, wherein:

FIGS. 7A, 7B and 7C illustrate the first embodiment of the construction packer mounted with multiple stacking shims;

DETAILED DESCRIPTION

The drawings show various versions of a construction packer 10, also referred herein interchangeably as a building packer. The construction packer 10 can be assembled in a variety of selectively desirable packing thicknesses but where the assembly remains connected during preparation and insertion to enable handling and fixing as a unitary piece without the inconvenience of slippage and dislodgement between stacked shims. Furthermore, the packer 10 is provided with an angle, specifically a right angle, which can assist the tradesperson with more accurate alignment or insertion of the packer.

FIGS. 1A to 2C illustrate a first embodiment of a construction packer 10, referred to herein as a solid packer, for use in circumstances where horseshoe-type packers are not required to clear bolts, etc. For example, the solid packer could be used by plasterers and carpenters to level a wall before hanging plasterboard.

FIGS. 3A to 4B illustrate a second embodiment of a construction packer 10, which is similar to the first embodiment but that it is provided with an obstacle recess 19 to allow the packer 10 to be placed over or around obstacles and protrusions such as locating bolts, brackets and other building elements.

Figure 5A:
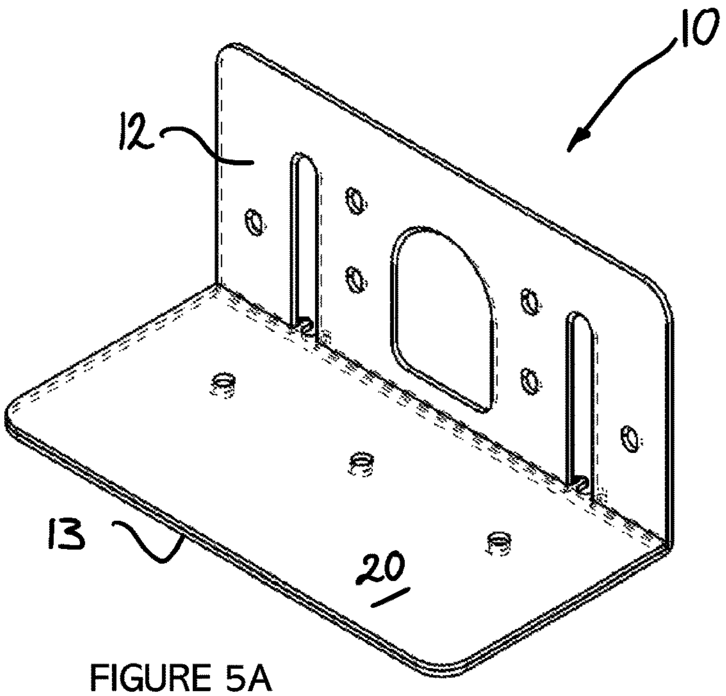
FIGS. 5A and 5B respectively show an isometric view and a side view of the construction packer of the first embodiment with the stacking shim mounted onto the base part.
Figure 5B:
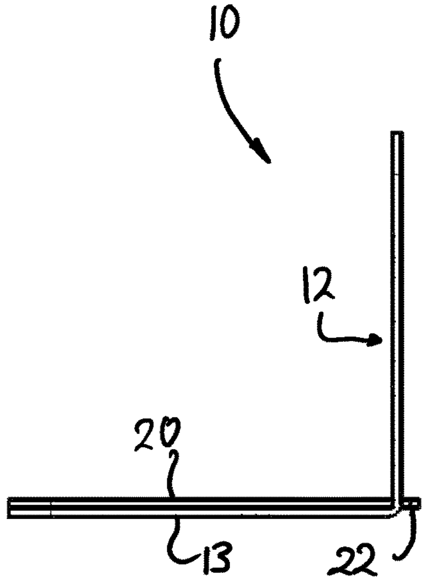
Figure 6A:
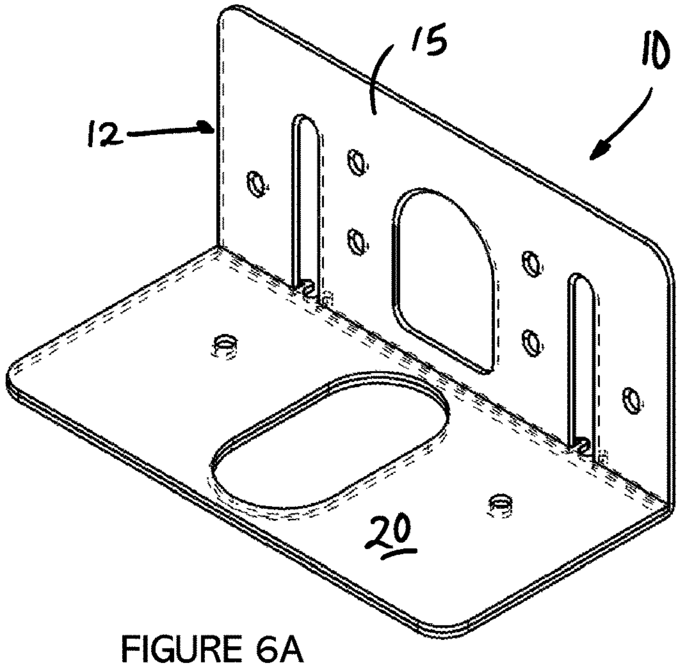
FIGS. 6A and 6B respectively show an isometric view and a side view of the construction packer of the second embodiment with the stacking shim mounted onto the base part.
Figure 6B:
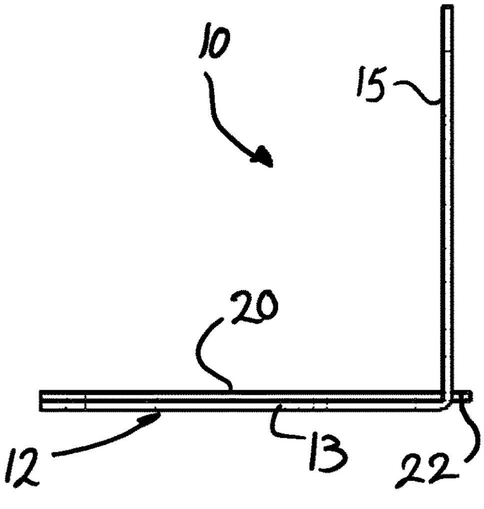

FIGS. 1A to 4B illustrate the components of the first and second embodiments of the construction packers separated, whereas FIGS. 5A to 6B illustrate the embodiments in an assembled state. Specifically, FIGS. 5A and 5B show an assembled construction packer 10 of the first embodiment in a front isometric view and in side view respectively, whereas FIGS. 6A and 6B illustrate the assembled construction packer 10 of the second embodiment in front isometric view and side view respectively.

Each construction packer 10 comprises a base frame, also referred to as a base part 12, and a stacking shim 20, which can be connected together to produce a single assembly that can be handled as a unitary piece. The base part 12 is illustrated in FIGS. 1A to 1D and 3A to 3D and has a base shim 13, which is the part adapted to be wedged into a gap or fixed to pack out a structure. A base wall 15 extends substantially perpendicular to the base shim, forming a right angle with the base shim that can be placed against a corresponding right angle for accurate alignment, for example against on a timber or metal frame or against a panel edge.

The stacking shim 20, which is illustrated in FIGS. 2A to 2C and 4A and 4B, also referred to as a packer insert, is a planar component that is designed to securely sit on top of the base shim 13. The shim 20 can be described as being inserted onto the base part 12 so as to secure the two parts together, and as a unitary assembly. One or more stacking shims 20 may be stacked on top of each other and supported by base shim 13. The stacking shims 20 may be provided in a variety of thicknesses, and may be colour coded according to their thickness, to allow a user to achieve a desired packing height by selecting a combination of stacking shim thicknesses to achieve that desired height (taking also into consideration the thickness of the base shim).

In the embodiments shown, the base shim 13 and stacking shim 20 are of a similar planar rectangular shape with rounded corners. The similar shape allows for easier stacking. The base wall 15 extends perpendicularly from the base shim 13 along a long side of the rectangular base shim 13. The wall may be attached in this manner with the base shim 13 or may be formed at right angles during manufacture by, for example, a moulding process if made from a plastics, or bending if made from metal.

The base wall is provided with a first interlocking feature that is designed to receive a second interlocking features provided on the stacking shim. Specifically, the first interlocking feature is at least one wall slot 16 on the base wall 15 that receives one or more second interlocking features provided on one or more stacking shims 20, where the second interlocking feature on the stacking shim is a detent that is forced into the wall slot 16, deflecting under its own resilience to engage with the slot. In the embodiments shown, the second interlocking feature is an anchoring clip 22. The anchoring clip 22 of the stacking shim 20 is designed to snap fit as a plug into the wall slot in order to couple the together the base part and stacking shim 20. Preferably, the anchoring clip will engage with the slot via a snap fit connection that is permanent and cannot be reversed without damaging the stacking shim or base wall.

For stability and secure engagement, the base wall 15 has two wall slots 16 spaced apart at even spacing from side edges 17 of the wall 15. The slots 16 commence from a juncture between the base shim and the wall and extend up the base wall away from the base shim terminating short of a top 18 of wall 15. The slot could continue right through to open at the top 18 of the wall but it is considered such a structure could compromise the strength and integrity of the construction packer. The height of the slots 16 can be defined by the maximum packing height permitted by the base part, and namely the maximum height at which stacking shims may be fitted into the base wall.

As discussed, the slots 16 are adapted to receive multiple stacking shim clips 22, where each stacking shim is provided with a number of clips corresponding to the number of slots on the base wall. In the embodiments illustrated, there are two anchoring clips 22 for each stacking shim, that correspond to fit into the two slots 16 on the base wall. The clips are spaced apart the same distance as the slots are spaced. The clips 22 are provided at a side edge of the stacking shim 20 facing outwardly of the side edge in the same plane as the plane of the stacking shim.

While the connection between the base part and the stacking shims has been described herein as comprising receiving slots on the base wall to receive the protruding clips on the shim, it is envisaged that the reverse arrangement could also work. In such an arrangement it would be the wall provided with a protruding clip, quite possibly in the form of an interactive vertical rib facing inwardly of the base part, and stacking shims having receiving notches on their periphery for receiving and clipping on to the rib.

Figure 1A:
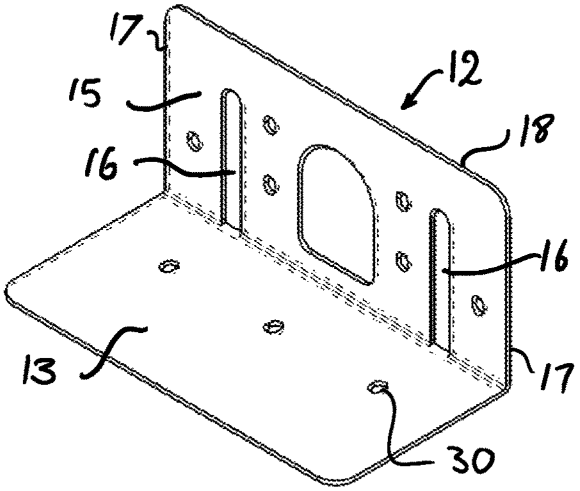
FIGS. 1A, 1B, 1C and 1D respectively show in isometric view, side view, plan view and front view a base part of a construction packer in accordance with a first embodiment of the present invention.
Figure 1B:
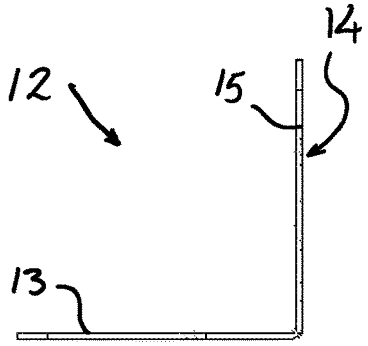
Figure 1C:
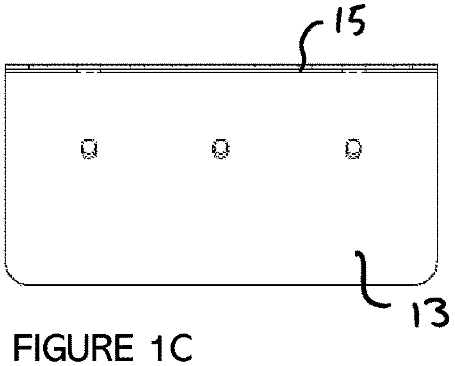
Figure 1D:
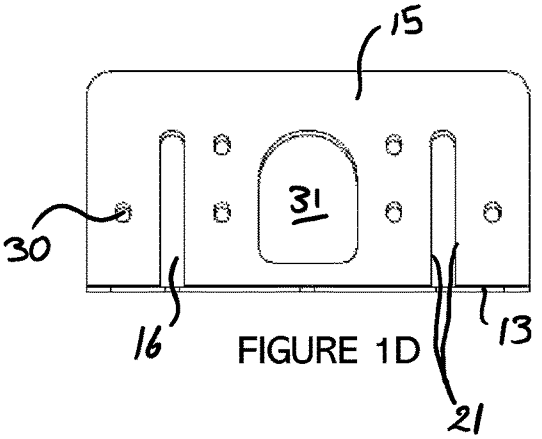
Figure 2A:
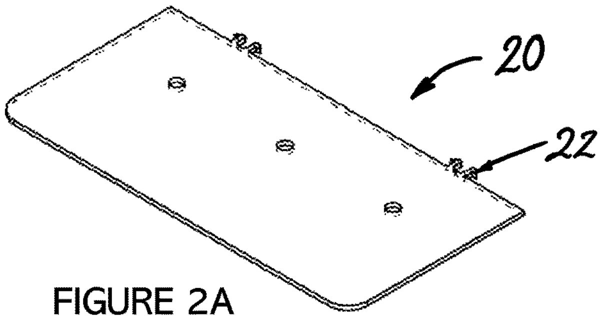
FIGS. 2A and 2B respectively show an isometric view and a plan view of a stacking shim of a construction packer in accordance with the first embodiment.
Figure 2B:
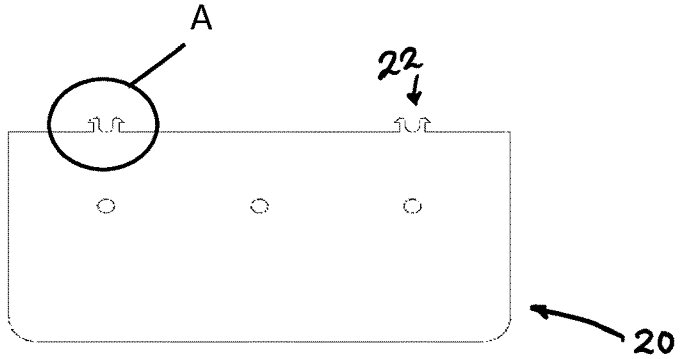
Figure 2C:
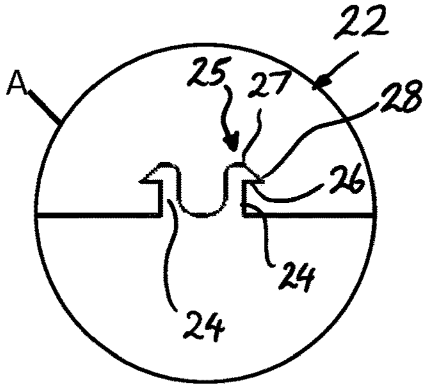
FIG. 2C is an enlarged view of circled Area A taken from FIG. 2B.
Figure 3A:
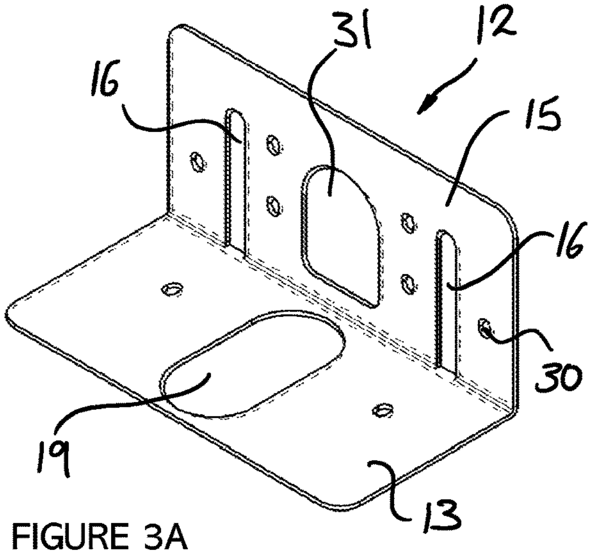
FIGS. 3A, 3B, 3C and 3D respectively show in isometric view, side view, plan view and front view a base part of a construction packer in accordance with a second embodiment of the present invention.
Figure 3B:
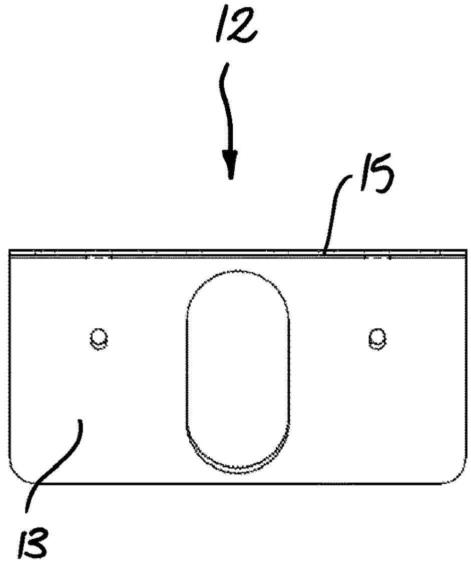
Figure 3C:
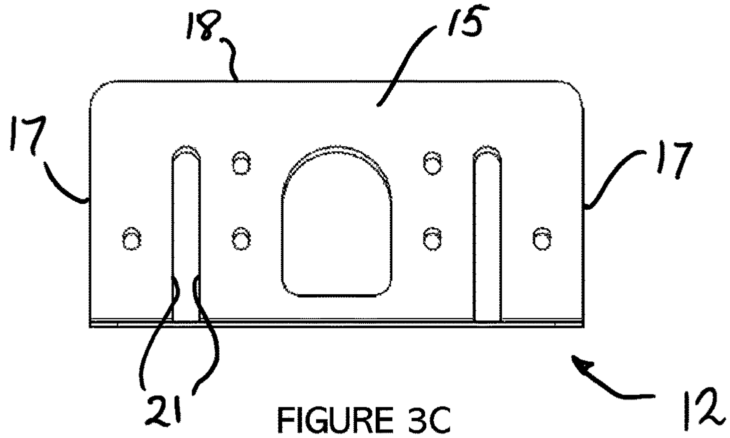
Figure 3D:
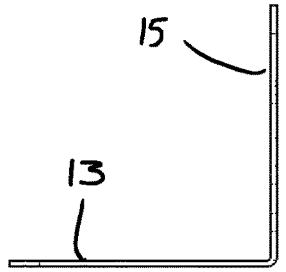
Figure 4A:
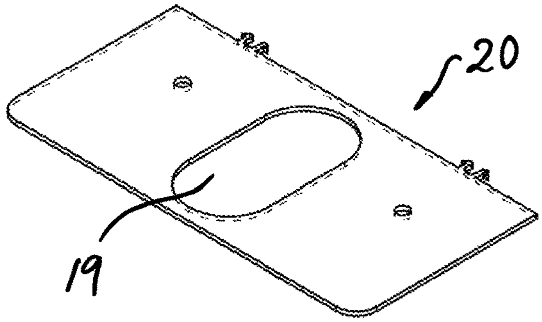
FIGS. 4A and 4B respectively show an isometric view and a plan view of a stacking shim of a construction packer in accordance with the second embodiment.
Figure 4B:
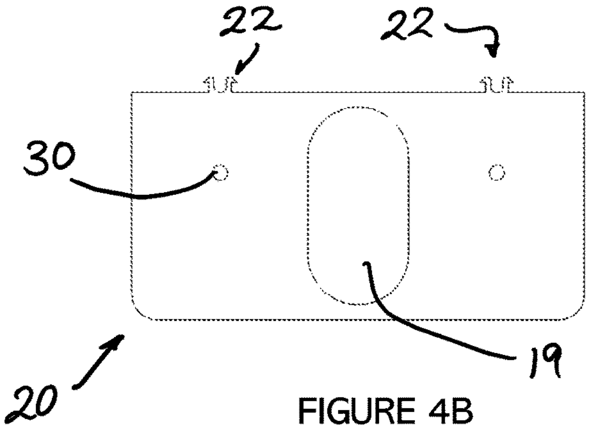

FIG. 2C shows an enlarged view of one of the clips 22 from the stacking shim 20 shown in FIG. 2B. The second embodiment of the stacking shim shown in FIGS. 4A and 4B have the same clips. The clip 22 comprises two spaced apart short fingers 24 that can resiliently flex towards each other to narrow the distance between them and clear the width of slot 16 thereby entering it. The distance between the outer sides of the fingers approximately corresponds to the width of slot 16.

The ends of fingers 24 are each capped with a retaining lip 25. Retaining lips 25 act to both encourage inward flexing of fingers 24 and, once the lips 25 clear the slot 16, to retain engagement of the clip 22, and therefore the stacking shim 20, with base part 12. The lips 25 are able to secure the stacking shim and base part by having a flat underside 26 that catches against an exterior face 14 of base wall 15 to prevent retraction of the clip 22 back through slot 16. The lips on each pair of fingers 24 are flanges that face away from each other to effectively increase the effective width of the clip 22 compared to the width of the fingers 24 not including the lips 25. Accordingly while in the engaged state the fingers 24 lie in the slot 16, the lips 25 have cleared the slot and hook behind the base wall 15.

Additionally, the lips 25 encourage inward flexing of the fingers 24 by way of a rounded, ramped or cammed upper surface 27. The direction of the ramps taper outwardly of the lips toward thinner flanged edges 28. Accordingly, on initial insertion in slot 16 the thicker upper side of the ramped surface 27 will first contact the side edges of slots 16. With greater force inserting clip 22 through the slot 16, the side edges 21 of the slot 16 will slide along the ramped surface 27 and down toward the thinner flanged outer edge 28. Because the fingers 24 contain an element of flex, the fingers will bend somewhat toward each other as the slot edges 21 slide toward outer lip edges 28. As soon as the outer lip edges 28 clear the slot edges 21, the resilient fingers will snap back into their original position, locked into the slot by the capped lips.

Various fastening holes 30 are provided on the base part 12 and stacking shim 20. The fastening holes on the stacking shim 20 line up with corresponding fastening holes 30 on the base shim 13 so that screws and other fasteners can be driven through aligned fastening holes. Fastening holes 30 on the base wall assist in fixing the construction packer to structures from an exposed face, namely, not the face of the structure that is being packed.

The drawings also show the base wall having a central recess 31. This recess is not important to the workings of the construction packer but may have the effect of reducing the overall weight of the construction packer, the overall material cost or may suitably be used to allow for obstacles such as fasteners or the like.

FIGS. 5A and 5B illustrate the first embodiment of an assembled construction packer 10 having a solid base shim 13, whereas FIGS. 6A and 6B illustrate the second embodiment of an assembled construction packer 10 having an obstacle recess 19. These figures illustrate one stacking shim 20 mounted onto the base shim 13 to raise the packing height, or thickness, of the construction packer. Only one stacking shim 20 is shown in FIGS. 5A, 5B, but FIGS. 7A-7C illustrate a number of shims 20 stacked one on top of another. The number of shims 20 stacked can be as desired, up until the maximum stacking height defined by the height of the slot 16.

Figure 8A:
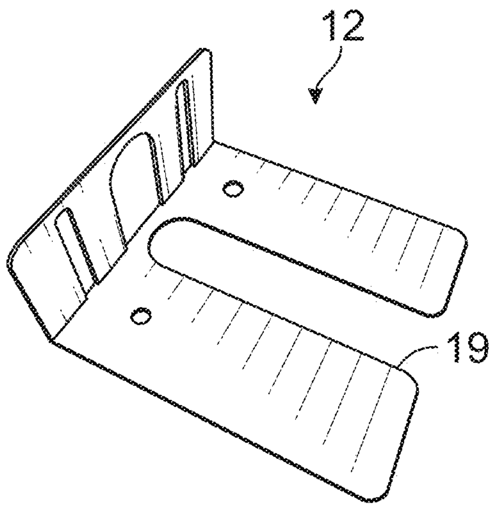
FIGS. 8A, 8B, 8C and 8D illustrate a third embodiment of a construction packer including a base part of FIG. 8A along with the stacking shim of FIG. 8B being stacked and assembled in FIGS. 8C and 8D.
Figure 8B:
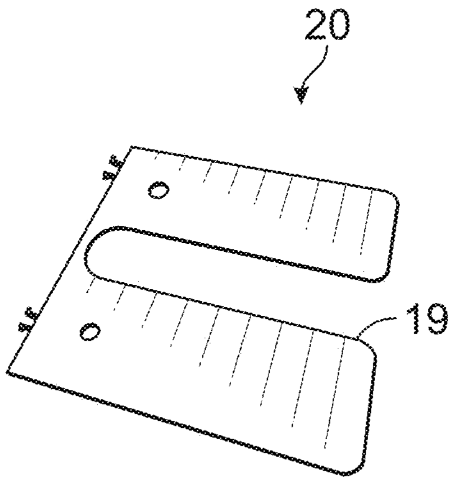
Figure 8C:
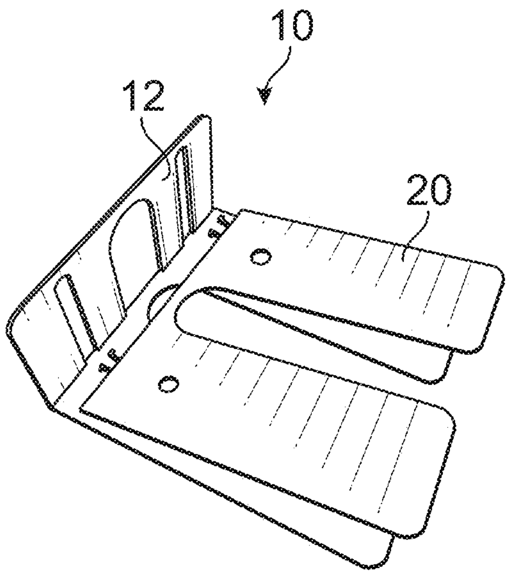
Figure 8D:
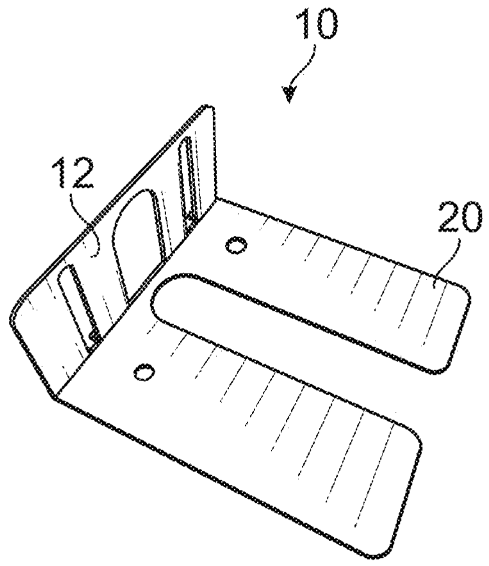

FIGS. 8A to 8D illustrate a third embodiment of the construction packer 10 closer in style to a traditional horseshoe shim, but having the stackability and unity of the present invention. The obstacle recess 19 in this packer is not a complete recess but opens to a side edge of the base shim 13 making it horseshoe shaped. Accordingly, the stacking shim 20 that mirrors the shape of the base shim is similarly horseshoe shaped. FIGS. 8C and 8D illustrate the stacking shim 20 being placed on top of the base shim 13 and clipped into the wall slots 16.

Figure 9A:
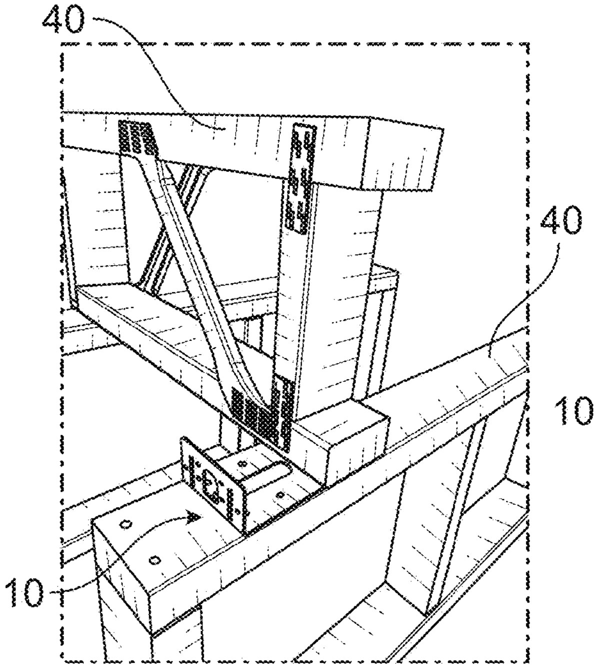
FIGS. 9A and 9B illustrate the construction packer of the second embodiment being inserted and used to pack a gap in a truss frame.
Figure 9B:
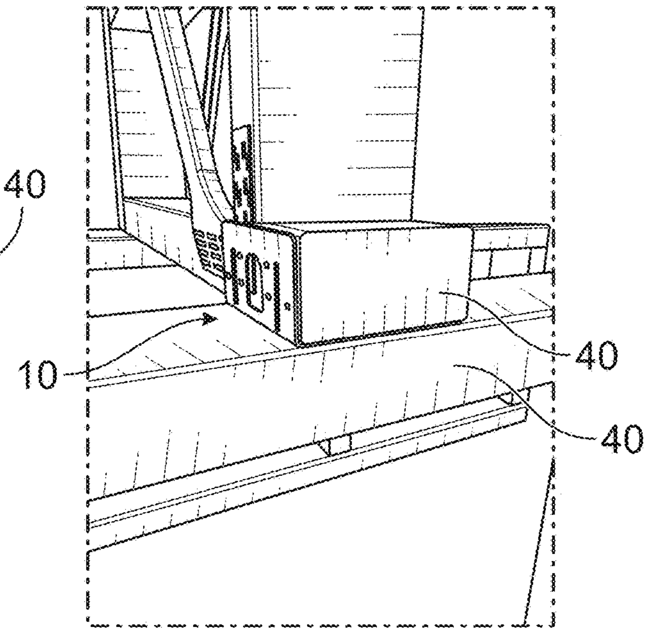

FIGS. 9A and 9B illustrate the second embodiment of the construction packer 10, namely that having a closed obstacle recess 19, being inserted and wedged between two timber frame members 40 that could form a flooring structure. In this case, the construction packer is used without any stacking shim 20, to provide a minimum packing between the frame members. Once inserted, the construction packer may be fixed to the timber member against which the base wall lies, or may simply be left without fixing relying instead on the weight of the structure to keep the packer wedged in.

Figure 10:
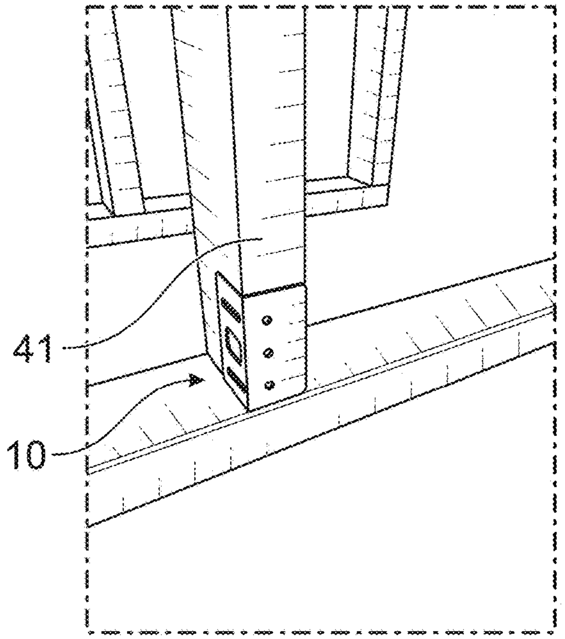
FIG. 10 illustrates the construction packer of the first embodiment assembled and fixed to a building stud in preparation for packing a plaster wall.

In FIG. 10 the solid shim construction packer 10 is placed, and fixed with fasteners, against a vertical timber wall stud 41 in preparation for receiving and levelling plasterboard for forming a wall surface. Various fixing means could be used to fix the base part 12 in position including but not limited to screws, nails and staples. The base shim may include other features that are not shown that would mitigate the impact the fixing means has on the packing height or protrusion against a finished surface, such as plasterboard. For example, a countersunk recess for the fastener could be provided, or an additional fixing lug on an edge of the shim to move the fixing location away from where it could impact the packing height or be seen through a finished surface.

Once again, the number of stacking shims 20 used, if at all, relies solely at the discretion of the tradesperson in deciding how much packing is required. The stacking shims, and indeed the base part, may be colour coded according to degrees of packing thicknesses.

It is envisaged that the present construction packer components are made from a thermoplastic polymer, such as polypropylene and formed by injection moulding. Recycled materials including recycled plastics could be used to form the packer components. Such a construction packer will not corrode, is lightweight and easy to use, and can sustain high loading while still providing effective spacing. Alternatively, other materials or composite materials could used. For example, the building packer parts could be made from other thermoplastic polymers such as ABS (acrylonitrile butadiene styrene), which is a strong load bearing material that will not deteriorate by environmental factors. Other examples of possible materials include high density polyethylene, polyvinylchloride, nylons and styrene. As discussed above, metallic material could also be used to make the construction packer.

The base part 12 and stacking shim 20 will be dimensioned for suitability to a broad range of construction scenarios from frame packing, wall packing, panel—including concrete panel—packing, packing for indoor and outdoor tiling, and landscaping. In the embodiments illustrated, the base part 12 has a depth of 45 mm to receive stacking shims of 45 mm depth. Alternatively, a shallower construction packer would have a base part and stacking shim having a depth of 35 mm. The height of the base wall is 45 mm, but again this can be varied depending on intended building application.

In the embodiments illustrated the width of the construction packer 10, including the width of the stacking shim 20, is 90 mm and the slots 16 are spaced apart at 55 mm. It follows that the spacing of the clips 22 on the stacking shims are also spaced apart at 55 mm. The thickness of the base shim 13, and of the entire base part 12, is 1 mm. This provides an initial packing thickness of 1 mm where the base part can be used to pack a gap without any stacking shims. The stacking shims 20 may be provided in a variety of sizes to selectively increase the packing thickness, including from about 1.0 mm, 1.5 mm, 2.0 mm, 5.0 mm, 10.0 mm or multiple of these or even thicker.

The construction packer may be provided in sets of base parts and multiple colour-coded stacking shims of varying thicknesses. The present right angled base component provides for easy and accurate placement of the construction packer in the correct position. The tradesperson can be assured of level and even placement against any right-angled corner, frame edge or wall. Furthermore, the base wall of the right angle provides a guide in the form of a slot by which additional shims may be stacked and clipped to the base component. Together the base component with stacking shim(s) provide for a variable height packer that can be assembled to the desired height yet be handled as a single piece because all components remain interconnected. This offers great value to tradespeople on site in the form of time efficiencies and ease of use.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, namely, to specify the presence of the stated features but not to preclude the presence or addition of further features in various embodiments of the invention.

It is to be understood that the aforegoing description refers merely to preferred embodiments of invention, and that variations and modifications will be possible thereto without departing from the spirit and scope of the invention, the ambit of which is to be determined from the following claims.

The invention claimed is:

1. A construction packer comprising a base part including a base shim and a wall component extending substantially perpendicular to the base shim, the wall component having a first interlocking feature; and a stacking shim configured to be placed on top of the base shim and having a second interlocking feature provided at an edge thereof that engages with the first interlocking feature to provide an assembled construction packer;

wherein the first interlocking feature is a slot and the second interlocking feature is a detent that engages with the slot, wherein the detent has a resilient width that narrows when forced through the slot and widens once through the slot to prevent removal from the slot.

2. The construction packer claimed in claim 1, wherein the first interlocking feature is configured to receive multiple second interlocking features corresponding to multiple stacking shims stacked one on top of the other and engaged with the base part.

3. The construction packer claimed in claim 1, wherein the slot is open from a juncture between the base shim and the wall component and extends along the wall component away from the juncture.

4. The construction packer claimed in claim 1, wherein the length of the slot defines a stacking guide for receiving one or more stacking shims.

5. The construction packer claimed in claim 1, wherein the first interlocking feature comprises two parallel slots in the wall component.

6. The construction packer claimed in claim 1, wherein the detent is specifically an anchoring clip that protrudes from a side edge of the stacking shim.

7. The construction packer claimed in claim 1, wherein the detent comprises two spaced apart fingers each capped with an outward facing retaining lip, wherein the fingers are resiliently movable toward each other and the lips prevent the detent removing from the slot.

8. The construction packer claimed in claim 1, wherein the number of second interlocking features is equal to the number of first interlocking features.

9. The construction packer claimed in claim 1, wherein the wall component extends from the base shim at a right angle.

10. The construction packer claimed in claim 1, wherein the base shim is provided with an obstacle recess for accommodating building hardware.

11. The construction packer claimed in claim 1, wherein the stacking shim is colour-coded according to its thickness.

12. The construction packer claimed in claim 1, wherein the base part and stacking shim are made of a thermoplastic.

13. The construction packer claimed in claim 6, wherein the anchoring clip protrudes from the side edge in the same plane as the stacking shim.

* * * * *